(12) United States Patent
Noh

(10) Patent No.: US 10,043,382 B2
(45) Date of Patent: Aug. 7, 2018

(54) DISPLAY APPARATUS AND METHOD OF DISPLAYING A MESSAGE

(71) Applicant: SAMSUNG ELECTRONICS CO., LTD., Suwon-si (KR)

(72) Inventor: Young-joong Noh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 14/140,073

(22) Filed: Dec. 24, 2013

(65) Prior Publication Data

US 2014/0176316 A1    Jun. 26, 2014

(30) Foreign Application Priority Data

Dec. 24, 2012 (KR) .................. 10-2012-0152085

(51) Int. Cl.
| | |
|---|---|
| *G08C 19/00* | (2006.01) |
| *H04N 21/41* | (2011.01) |
| *H04N 21/436* | (2011.01) |
| *H04N 21/485* | (2011.01) |
| *H04L 12/28* | (2006.01) |

(52) U.S. Cl.
CPC ............ *G08C 19/00* (2013.01); *H04L 12/282* (2013.01); *H04N 21/4131* (2013.01); *H04N 21/43615* (2013.01); *H04N 21/485* (2013.01)

(58) Field of Classification Search
None
See application file for complete search history.

(56) References Cited

U.S. PATENT DOCUMENTS

| | | | | |
|---|---|---|---|---|
| 7,363,031 B1* | 4/2008 | Aisa | ............. | H02J 13/0079 |
| | | | | 340/3.1 |
| 8,441,344 B2* | 5/2013 | Milch | ............. | B60R 25/104 |
| | | | | 340/425.5 |
| 2004/0097195 A1* | 5/2004 | Selleck | ............. | G06F 3/1423 |
| | | | | 455/41.3 |
| 2006/0050142 A1* | 3/2006 | Scott | ............. | G08C 17/02 |
| | | | | 348/14.05 |

(Continued)

FOREIGN PATENT DOCUMENTS

| | | |
|---|---|---|
| CN | 101536535 A | 9/2009 |
| EP | 2 131 579 A2 | 12/2009 |
| WO | 2011095567 A1 | 8/2011 |

OTHER PUBLICATIONS

Communication dated May 11, 2015, issued by the European Patent Office in counterpart European Application No. 13181903.9.

(Continued)

*Primary Examiner* — Quan-Zhen Wang
*Assistant Examiner* — Rajsheed Black-Childress
(74) *Attorney, Agent, or Firm* — Sughrue Mion, PLLC

(57) ABSTRACT

A display apparatus and a method of displaying a message are disclosed. The display apparatus includes a display; a communicator configured to communicate with at least one home appliance; a storage configured to store a user setting message; and a controller configured to control the communicator to communicate with a home appliance selected by a user, and to display the user setting message on the display according to a preset condition satisfaction signal in response to the preset condition satisfaction signal being received from the home appliance.

13 Claims, 11 Drawing Sheets

(56) References Cited

U.S. PATENT DOCUMENTS

| | | | | |
|---|---|---|---|---|
| 2008/0042868 A1* | 2/2008 | Lee | ................... | G05B 19/0423 |
| | | | | 340/4.32 |
| 2008/0282155 A1* | 11/2008 | Kempanna | ........ | G06F 17/30867 |
| | | | | 715/273 |
| 2010/0007515 A1* | 1/2010 | Ito | ......................... | G06Q 10/06 |
| | | | | 340/6.1 |
| 2010/0238046 A1 | 9/2010 | Lee et al. | | |
| 2013/0033648 A1* | 2/2013 | Oh | ................... | H04N 21/4316 |
| | | | | 348/731 |

OTHER PUBLICATIONS

Communication dated Dec. 18, 2013 issued by the European Patent Office in counterpart European Patent Application No. 13181903.9.
Communication dated Aug. 5, 2014 issued by the European Patent Office in counterpart European Application No. 13 181 903.9.
Communication dated Nov. 17, 2015 by the European Patent Office in related Application No. 13181903.9.
Communication dated Aug. 21, 2017, by the State Intellectual Property Office of People's Republic of China in counterpart Chinese Application No. 201310556716.5.
Communication issued by the State Intellectual Property Office of P.R. China dated Feb. 2, 2018 in counterpart Chinese Patent Application No. 201310556716.5.

\* cited by examiner

DISPLAY APPARATUS AND METHOD OF DISPLAYING A MESSAGE

CROSS-REFERENCE TO RELATED APPLICATION

This application claims priority from Korean Patent Application No. 10-2012-0152085, filed on Dec. 24, 2012 in the Korean Intellectual Property Office, the disclosure of which is incorporated herein by reference, in its entirety.

BACKGROUND

Field

Apparatuses and methods consistent with the exemplary embodiments relate to a display apparatus and a method of displaying a method thereof. More particularly, the exemplary embodiments refer to a display apparatus connectable to home appliances and a message display method thereof.

Description of the Related Art

Home networks, which have become wide spread in recent years, refer to a home system which enables household electronic and electric appliances to be connected via a single wireless or wire-based system in order to implement two-way communication. The home network allows automated adjustment of not only simple functions of remotely controlling home appliances, i.e., (home automation) but also high-tech functions, including information exchange, monitoring and security through data transmission and reception between home appliances. A user may switch on and off gas or electronic products from outside the home via a computer, a personal digital assistance (PDA) or a mobile phone and access multimedia content, such as education programs, movies, and games, via a TV.

The home network may be classified into a data network of home information and communication devices based on a computer, an audio/video (A/V) network of a TV and an audio system, and an information appliances network of household equipment based on white goods, depending on use. In the home network, wire-based technology, such as Ethernet, PLC, IEEE 1394 and home PNA, radio technology, such as IEEE 802.11 WLAN, IEEE 802.15 WPAN and UWB, and home network control middleware, such as UPnP, HAVI, JINI and Home Network Control Protocol (HNCP) are employed, and various kinds of services based on these technologies are being vigorously developed.

SUMMARY

An aspect of one or more exemplary embodiments is to provide a display apparatus capable of displaying various messages in connection with a home appliance, and a method of displaying a message.

An aspect of one or more exemplary embodiments is also to provide a display apparatus capable of achieving communications via delivery of messages between family members, and a method of displaying a message.

The foregoing and/or an aspect may be achieved by providing a display apparatus including: a display; a communicator configured to communicate with at least one home appliance; a storage configured to store a user setting message; and a controller configured to control the communicator to communicate with a home appliance selected by a user, and to display the user setting message on the display according to a preset condition satisfaction signal in response to the preset condition satisfaction signal being received from the home appliance.

The display apparatus may further include a user input configured to set up a specific function of the home appliance, and the controller may be configured to transmit information to the home appliance related to the set up specific function through the communicator and to receive a signal reporting a completion of the specific function as the condition satisfaction signal from the home appliance.

The display apparatus may further include a user input configured to set up the user setting message, and the user setting message may be set up through user input.

The display apparatus may further include a user input configured to set up the user setting message, and the user setting message may be set up through a selection from pre-stored messages.

The user setting message may include at least one of a graphic layer text, a text and an image.

The user setting message may be displayed on an entire area of the display.

The user setting message may be displayed on a partial area of the display.

The display apparatus may further include a sound output, and the controller may be configured to control the sound output to output a preset sound when the user setting message is displayed.

The controller may supply a power to the display and may display the user setting message in response to the condition satisfaction signal being received in a standby mode in which power is not supplied to the display.

The display apparatus may further include a user input configured to set up at least one of a display interval, a display time and a form of displaying the user setting message.

The foregoing and/or other aspects may be achieved by providing a method of displaying a message of a display apparatus communicating with at least one home appliance, the message display method including: setting up communications with a home appliance selected by a user; setting up a user setting message; and displaying the user setting message according to a preset condition satisfaction signal in response to the preset condition satisfaction signal being received from the home appliance.

The message display method may further include: setting up a specific function of the home appliance; transmitting to the home appliance information related to the set up specific function; and receiving as the condition satisfaction signal from the home appliance a signal reporting a completion of the specific function.

The user setting message may include at least one of a graphic layer text, a text and an image.

The message display method may further include outputting a preset sound when the user setting message is displayed.

The message display method may further include supplying power to a display in response to the condition satisfaction signal being received in a standby mode in which power is not supplied to the display.

The message display method may further include setting up at least one of a display interval, a display time and a form of display of the user setting message.

As described above, according to one or more exemplary embodiments, there are provided a display apparatus capable of displaying various messages in connection with a home appliance, and a control method thereof.

Also, there are provided a display apparatus capable of achieving communications via delivery of messages between family members, and a message display method thereof.

An aspect of an exemplary embodiment may further provide a display apparatus including: a controller configured to control a communicator in order to communicate with a home appliance selected by a user, and to display a user setting message according to a preset condition satisfaction signal in response to the preset condition satisfaction signal being received from the home appliance. The display apparatus may further include a display.

The display apparatus may further include a communicator configured to communicate with at least one home appliance.

The display apparatus may further include a storage configured to store a user setting message. The user setting message may be stored on the display.

The display apparatus may further include a user input configured to set up a specific function of the home appliance, wherein the controller transmits to the home appliance information related to the set up specific function through the communicator and receives as the condition satisfaction signal from the home appliance a signal reporting completion of the specific function.

The display apparatus may further include a sound output, wherein the controller is configured to control the sound output in order to output a preset sound in response to the user setting message being displayed.

The controller may supply power to the display and may display the user setting message in response to the condition satisfaction signal being received in a standby mode in which power is not supplied to the display.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
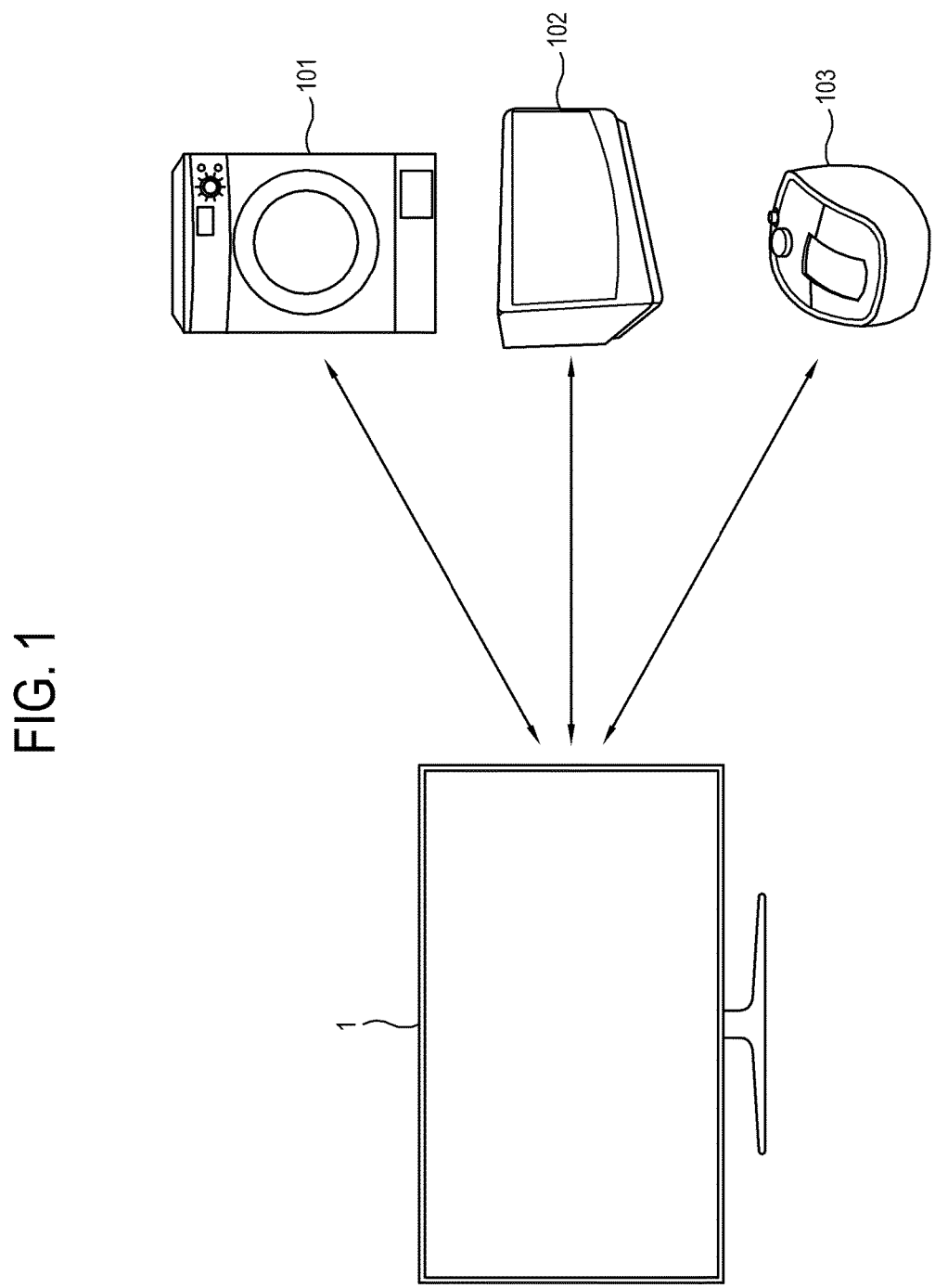
FIG. 1 schematically illustrates a display apparatus and home appliances, according to an exemplary embodiment.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 schematically illustrates a display apparatus and home appliances, according to an exemplary embodiment. As shown in FIG. 1, the display apparatus 1 may be connected to various home appliances 101, 102 and 103 at home or to various electronic devices at an office, via a network. In an exemplary embodiment, the display apparatus 1 may be implemented as a television at home, which is connected to a washing machine 101, a microwave oven 102 and an electric cooker 103. These devices may be connected via a wire-based local area network (LAN) or via wireless communication such as power line communication (PLC), Wi-Fi and Bluetooth®. Middleware supports home networking among a home computer, home appliances and a mobile phone, and includes Universal Plug and Play (UPnP), Home Audio Video Interoperability (HaVi), Java Intelligent Network Infra-structure (JiNi), Video Electronics Standards Association (VESA) and Digital Living Network Alliance (DLNA). The display apparatus 1 and the home appliances 101, 102 and 103 according to an exemplary embodiment may communicate according to the DLNA established on the basis of the open standard, e.g. industrial standard such as HyperText Transfer Protocol (HTTP), UPnP and Wi-Fi. Network connection between electronic devices may be established by any existing method of communication, without being limited to any particular method.

The home appliances 101, 102 and 103 connected to the display apparatus 1 include a user input configured to receive a user selection or input so that a user may control the appliances to perform a particular function, and may include a display configured to display a graphic user interface (GUI).

Figure 2:
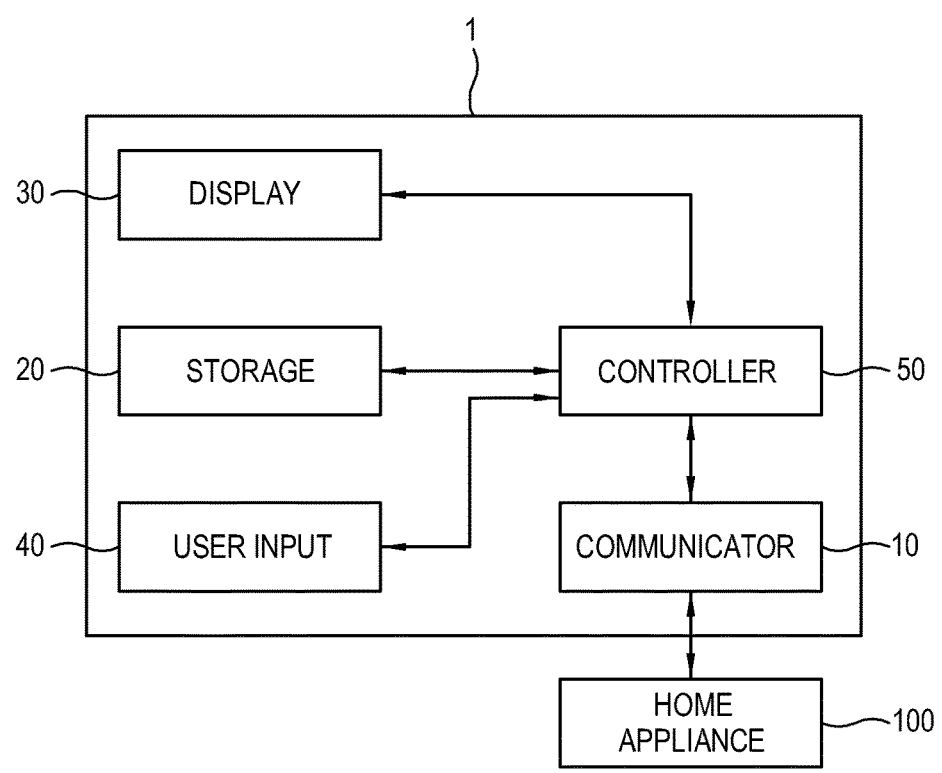
FIG. 2 is a block diagram illustrating a display apparatus, according to an exemplary embodiment.

FIG. 2 is a block diagram which illustrates a display apparatus according to an exemplary embodiment. For convenience of description, the display apparatus 1 is described as being connected to a single home appliance 100. The display apparatus 1 includes a communicator 10 configured to communicate with the home appliance 100, a storage 20, a display 30, a user input 40 and a controller 50 configured to control these elements. The display apparatus 1 further includes a signal processor (not shown) to process content data stored in a content provider or the storage 20, for display on the display 30. The home appliance 100 includes a communicator (not shown) configured to communicate with the display apparatus 1.

The communicator 10 begins communication with the home appliance 100 according to the control of the controller 50 and communicates with the home appliance 100 according to a predetermined communication protocol. The communicator 10 is able to communicate with one or a plurality of home appliances 100 and receive a condition satisfaction signal transmitted from the home appliance 100. In response to the communicator communicating with a plurality of home appliances 100, a signal received from each home appliance 100, particularly a condition satisfaction signal, may include an identifier for each home appliance 100. The condition satisfaction signal refers to a signal that the home appliance 100 transmits to the display apparatus 1 in response to a specific function of the home appliance 100 set up by the user being completed or meeting a specific condition. The condition satisfaction signal is a precondition for the display apparatus 10 to display a user setting message, and the display apparatus 1 displays various user setting messages based on the condition satisfaction signal.

The storage 20 is configured to a user setting message which is preset or input by the user. The user setting message refers to a GUI displayed on the display 30, based on a condition satisfaction signal of the home appliance 100.

The display 30 displays various content images processed by a signal processing block (not shown) and user setting messages, and may include a flat panel, such as a liquid crystal display (LCD), an organic light emitting display (OLED) and a plasma display panel (PDP).

The user input 40 is a user interface is configured to set up a specific function of the home appliance 100 and a user setting message. The user input 40 may be configured as a remote controller in order to control the television from a distance or include a button formed on an outside of the display 30. In response to the display apparatus 1 being configured as a computer system, the user input 30 may be configured as a keyboard including buttons, or as a touch pad or touch screen which includes a touch sensor. Alternatively, the user input unit 40 may include a wheel-type input and various motion detection configured to detect a motion and to transmit user intent to the controller 50.

The controller 50 is configured to control the communicator 10 in order to communicate with the home appliance 100 selected by the user, and displays on the display unit 30 a user setting message in accordance with a preset condition satisfaction signal in response to the preset condition satisfaction signal being received from the home appliance 100.

Figure 3A:
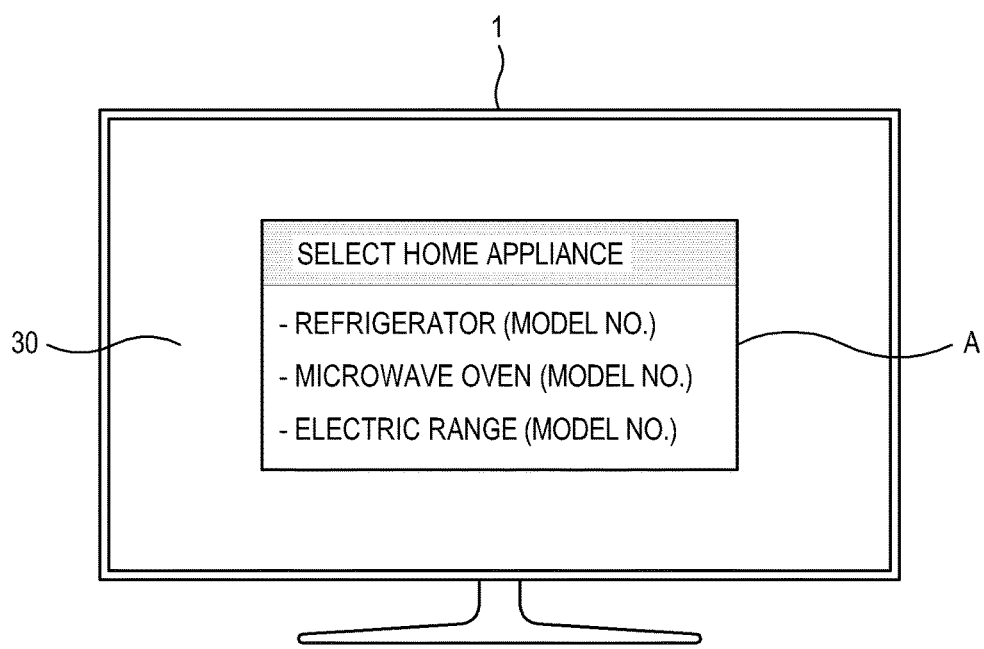
FIGS. 3A and 3B illustrate graphic user interfaces (GUIs) to respectively set up a specific function of a home appliance in the display apparatus, according to an exemplary embodiment.
Figure 3B:
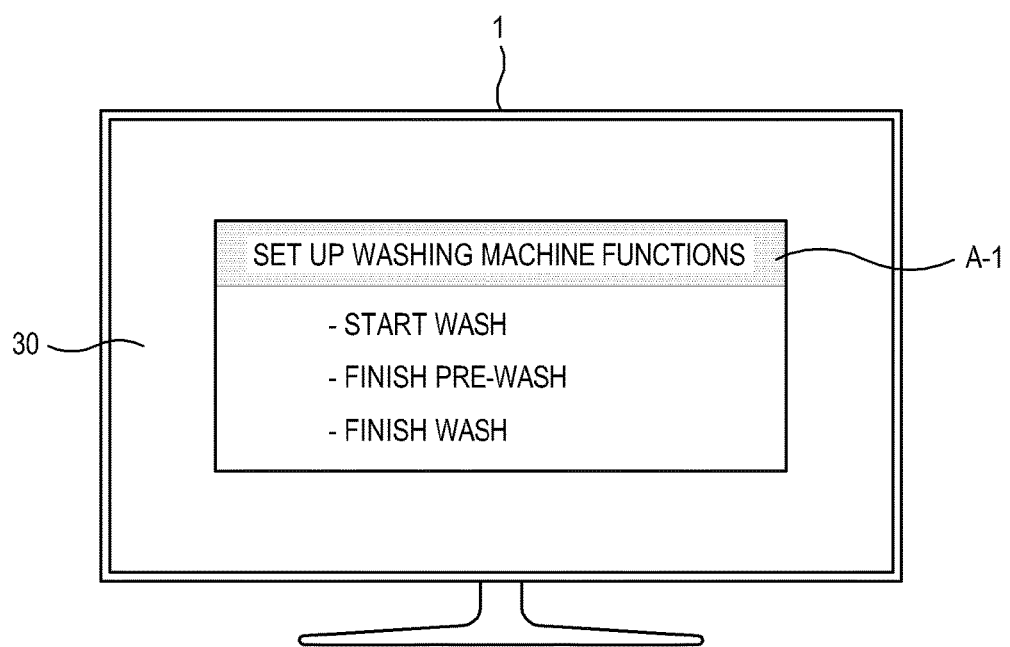

FIGS. 3A and 3B illustrate graphic user interfaces (GUIs) configured to set up a specific function of a home appliance in the display apparatus, according to an exemplary embodiment.

Communication is established between the first display apparatus 1 and the home appliance. The controller 50 controls the communicator 10 in order to retrieve connectable home appliances through a current network and displays a list A of retrieved home appliances on the display unit 30, as shown in FIG. 3A. For example, the list A of the home appliances may display names of connected appliances, such as a washing machine, a microwave oven and an electric range, and may further include model numbers. The list A of the home appliances may include an image, instead of a text. For example, the list A of the home appliances may include an image of a home appliance or various images set by the user to distinguish home appliances. The user selects a home appliance to be involved in setting a specific function among the displayed home appliances. As described above, one or a plurality of home appliances may be set.

In response to the user selecting a washing machine, the display unit 30 displays a function or a specific operation condition of the washing machine, as shown in FIG. 3B. Displayed items A-1 include "Start wash," "Finish prewash," and "Finish wash." The user may schedule a time which she or he wants to do a wash from a present time and set up a pre-wash instead of a main wash. Of course, the user may select a wash completion item in which an entire washing cycle is finished.

In response to the user setting a specific function, the controller 50 transmits the setting to the home appliance through the communicator 10 and receives a signal reporting that the specific function is finished as a condition satisfaction signal from the home appliance. For example, in response to the user selecting the finish wash item, the washing machine transmits a signal indicating that a condition set by the user is satisfied, i.e., a condition satisfaction signal, to the display apparatus 1 when washing is finished after a predetermined period of time. That is, in response to the user setting a specific function of the home appliance, the home appliance informs the display apparatus 1 that the specific function is completed or that a certain condition is satisfied when the specific function is completed or when the certain condition is satisfied.

Figure 4A:
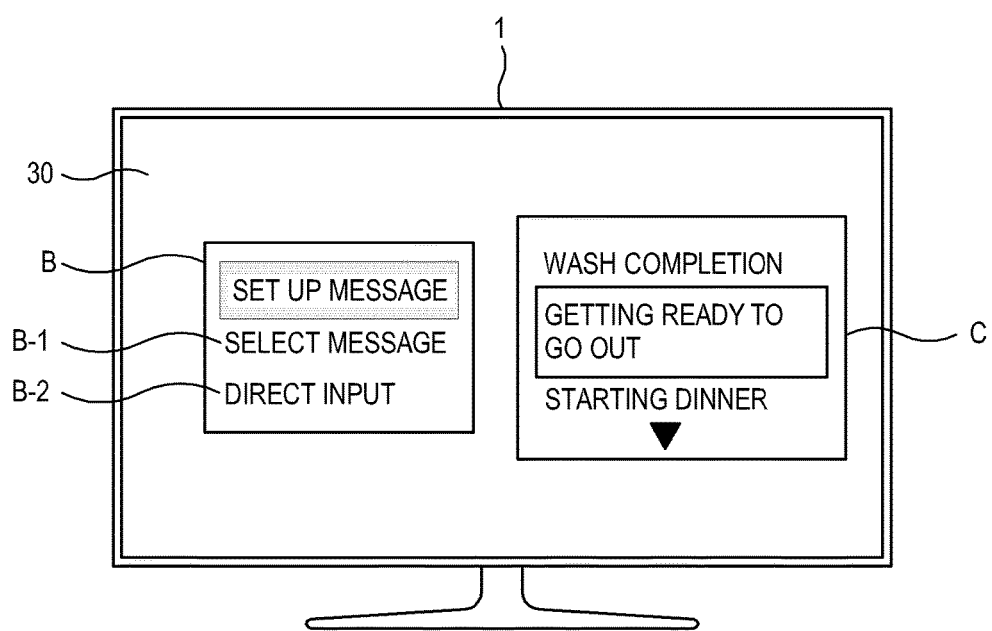
FIGS. 4A to 4C illustrate GUIs for respectively setting up a user setting message in the display apparatus according to an exemplary embodiment.
Figure 4B:
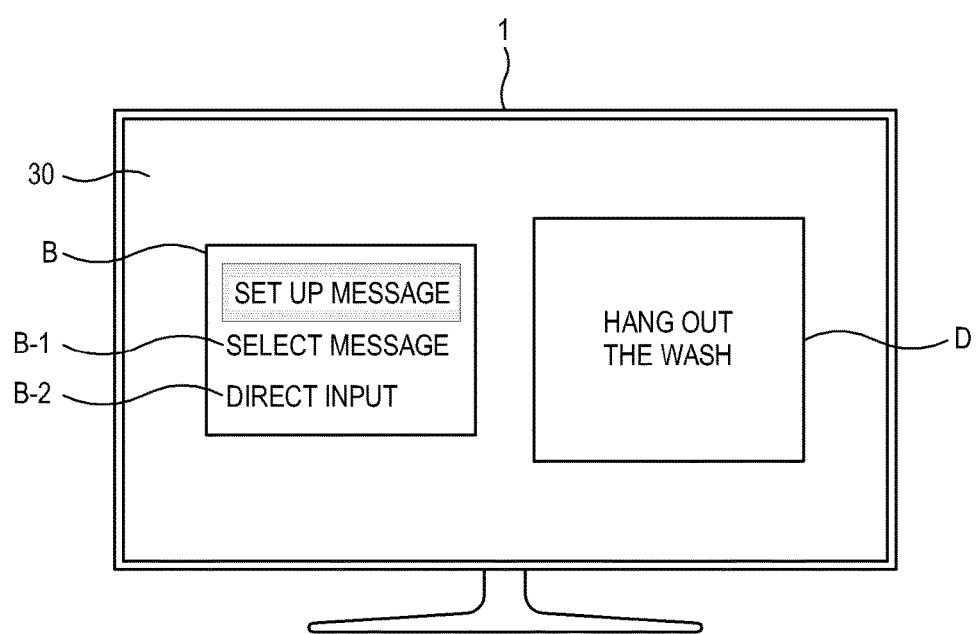
Figure 4C:
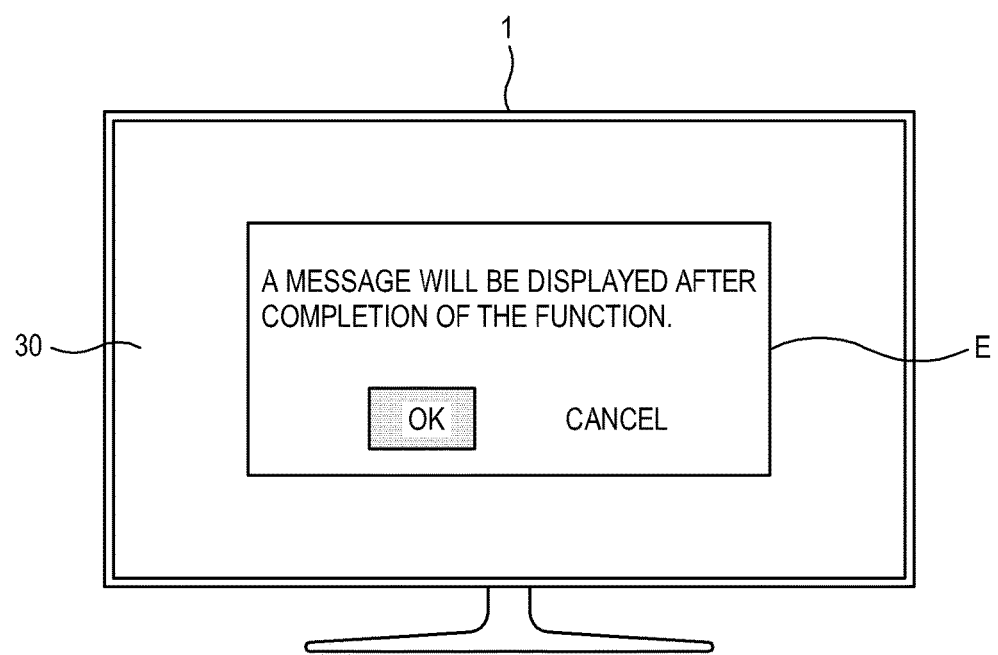

FIGS. 4A to 4C illustrate GUIs configured to respectively set up a user setting message in the display apparatus, according to an exemplary embodiment.

The user may set various forms of user setting messages. The user may set up a user setting message via selection from pre-stored messages or through direct input.

As shown in FIG. 4A, a message setup window B for setting up a message includes a section B-1 for selecting one of the pre-stored messages and a section B-2 for direct input. In response to the user selecting the message selection section B-1, a corresponding sub-window C is displayed. The sub-window C illustratively displays a plurality of user setting messages for the user to select a desired message to be displayed on the display 30. The user may select a wash completion message to report completion of wash or a message for getting ready to go out. These user setting messages may be stored in advance in the storage 20 by the user or may be stored during manufacture.

In response to the user selecting the section B-2 for input of a user setting message, a message input window D is displayed on the display 30, as shown in FIG. 4B. The user may input a message to be delivered using the user input unit 40. For example, in response to the user setting up the finish wash item as a specific function of the washing machine, the washing machine transmits to the display apparatus 1 information related to completion of washing as a condition satisfaction signal after completion of washing. In response to the user having input a user setting message "Hang out the wash" in advance, as shown in FIG. 4B, the display 30 displays the user setting message "Hang out the wash" after completion of washing. The user setting message input by the user may be stored as a user setting message, which is selectable by the user next time, as shown in FIG. 4A.

As shown in FIGS. 4A and 4B, when the user sets up the user setting message using the message setup window B, a confirmation window E with a notice "A message will be displayed after completion of the function" to confirm that the notice is displayed, as shown in FIG. 4C. The user selects "OK" or "cancel," thereby confirming again and selecting the user setting message.

Figure 5A:
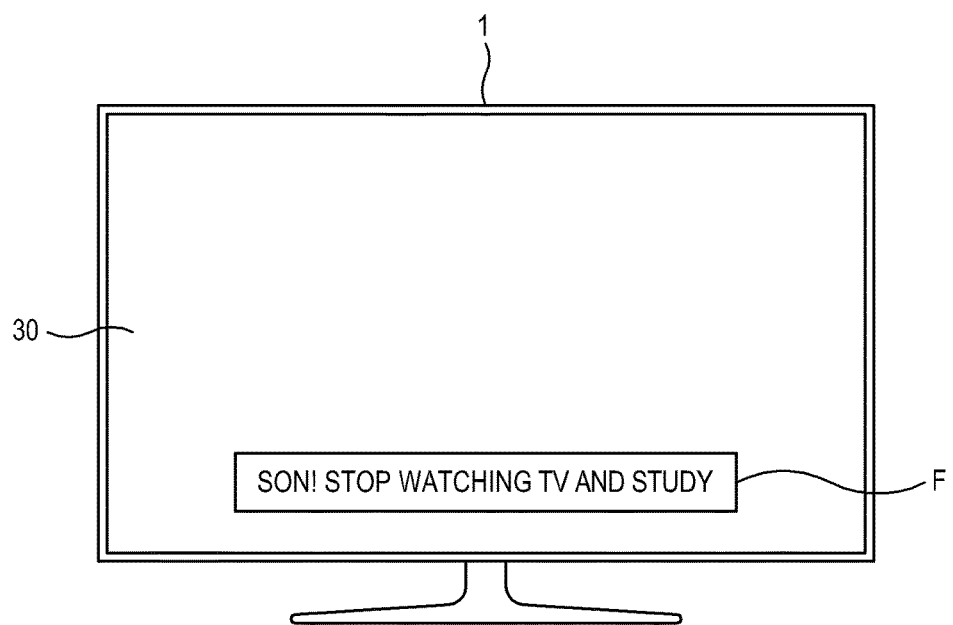
FIGS. 5A and 5B illustrate GUIs for respectively setting up user setting messages displayed on the display apparatus according to an exemplary embodiment.
Figure 5B:
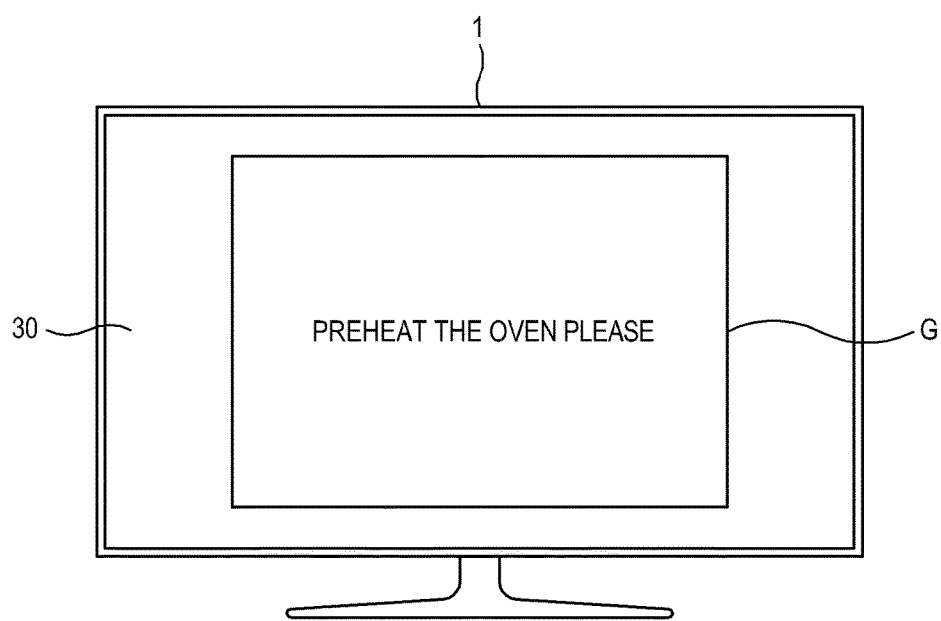

FIGS. 5A and 5B illustrate GUIs for a user setting message that are respectively displayed on the display apparatus according to an exemplary embodiment. As shown therein, a user setting message F "Son! Stop watching TV and study" may be displayed in a region at a bottom of the display 30. Displaying the message F in the region is for consideration of other users watching the display apparatus, 1 so as not to interrupt their view. The user setting message may be displayed in any particular area, for example, a right or left area, without being limited to the bottom of the display 30. FIG. 5B shows that a user setting message G is displayed on the entire display 30. The user watching the display apparatus 1 may see the user setting message G "Preheat the oven please" displayed on the entire display 30.

The user setting message may include at least one a graphic layer text, a text and an image. The user setting message may be inserted into the same layer as a different main image or may be inserted into a graphic layer, such as an on-screen display (OSD). When the user setting message is inserted into the graphic layer, the user setting message may be alpha-blended to adjust transparency. Further, the user setting message may be expressed as a text, as shown in FIGS. 5A and 5B, or as an image including a meaning of a message set by the user. For example, the user setting message may include an image implying a specific operation, such as a thumbnail or icon, or may include a still image or video stored by the user. For example, the user may link the window to input the user setting message as in FIG. 4B, to an address or a specific website where an image is stored, thereby displaying a desired image.

As such, the user setting message that the user displays on the display 30 may include various forms and be used as a new communication method between users of the display apparatus 1. Further, the user setting message may be displayed in connection with the home appliance, thereby increasing utilization of the home network and expanding use of the home appliance to family members, rather than a particular person.

According to another exemplary embodiment, the display apparatus 1 may further include a sound output configured to output a sound. In this case, the controller 50 may control the sound output to output a preset sound when a user setting message is displayed. The sound may be a beeping sound or a recorded voice of the user setting message. In response to the user setting message being both displayed and sounded as in exemplary embodiment, an auditory stimulus may be added, thereby enhancing an effect of delivering the user setting message.

Further, according to still another exemplary embodiment, in response to a condition satisfaction signal being received in a standby mode in which power is not supplied to the display 30, the controller 50 supplies power to the display 30 and displays a user setting message. That is, even as if a signal of the user input 40 or a power signal has been remotely received when the display apparatus 1 turns off power, the controller 50 may receive the condition satisfaction signal and the user setting message while in the standby mode.

Figure 6:
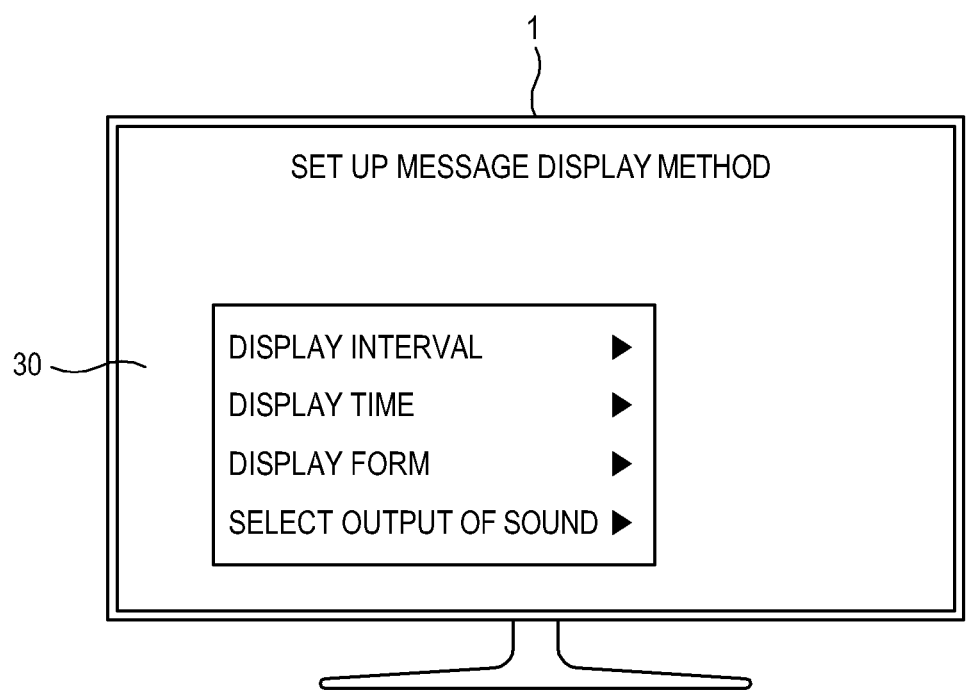
FIG. 6 illustrates a GUI for setting up a method of displaying on the display apparatus a user setting message, according to an exemplary embodiment.

FIG. 6 illustrates a GUI configured to set up a method of displaying a user setting message on the display apparatus according to an exemplary embodiment. As shown therein, the user may set up a display interval, a display time and a display form of the user setting message and may also make a selection as to whether to output a sound.

The user may also determine whether to briefly display the user setting message or to setup the message for a certain period of time, and set up the display interval so that the user setting message alternately appears and disappears.

Figure 7:
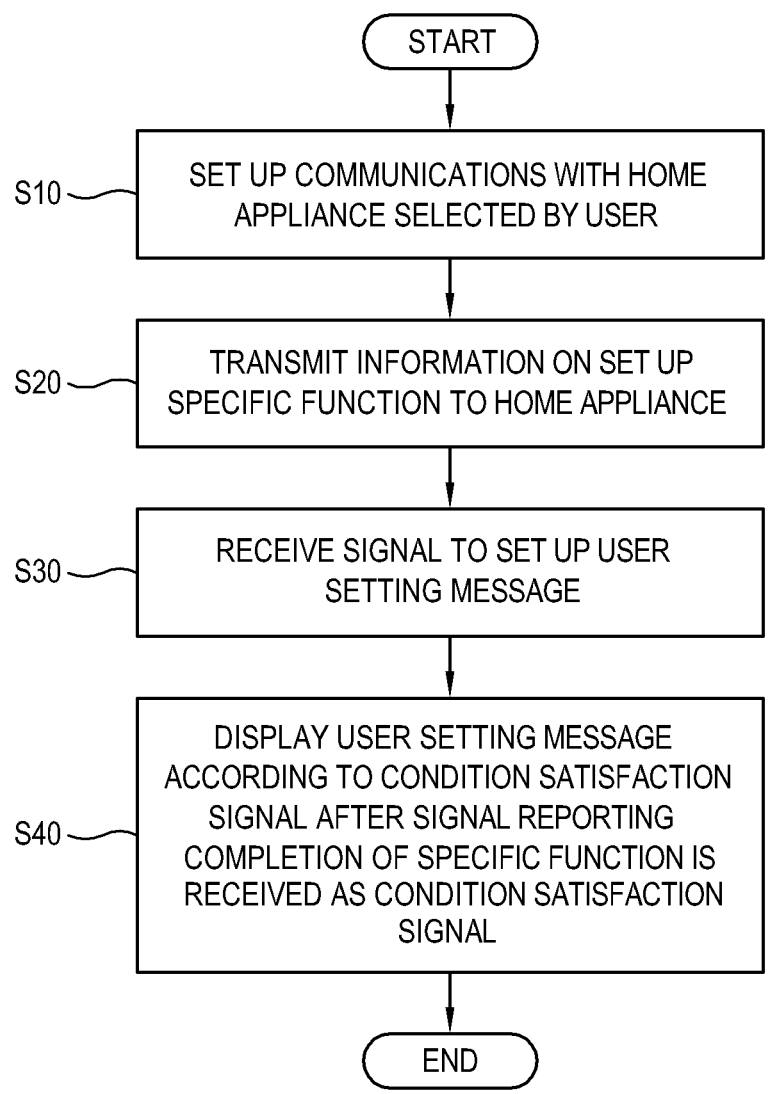
FIG. 7 is a flowchart which schematically illustrates a message display method of the display apparatus, according to an exemplary embodiment.

FIG. 7 is a flowchart which schematically illustrates a method of displaying a method of the display apparatus, according to an exemplary embodiment.

The controller 50 sets up and begins communications with a home appliance selected by the user (S10).

In response to the user setting up a specific function of a home appliance, the controller 50 transmits to the home appliance (S20) information related to the set specific function.

The controller 50 receives a signal to set up a user setting message and stores the signal in the storage 20 (S30).

When a signal reporting completion of the specific function is received as a condition satisfaction signal from the home appliance, the controller 50 displays the user setting message set up in advance which corresponds to the received condition satisfaction signal (S40).

The user setting message may include at least one of a graphic layer text, a text and an image. Further, in response to the user setting message being displayed, a preset sound may be output. In addition, the user may set up or change at least one of a display interval, a display time and a display form of the user setting message using a GUI.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display;
   a communicator configured to communicate with at least one home appliance;
   a storage configured to store a user setting message;
   a user input configured to receive input from a user of the display apparatus; and a
   controller configured to:
      control the communicator to perform at least one communication with the at least one home appliance,
      provide a list of at least one home appliance connected with the display apparatus via the communicator, based on the at least one communication,
      display the list of the at least one home appliance,
      select a home appliance from the displayed list based on the input, select a function associated with the home appliance based on the input, and in response to a preset condition satisfaction signal reporting completion of the function being received from the home appliance, display a user setting message on the display, wherein the user setting message is customized by the user in advance to provide a communication between users of the display apparatus in connection with the completion of the function associated with the home appliance,
   wherein the user setting message comprises at least one of a graphic layer text, a text or an image.

2. The display apparatus of claim 1, wherein the user setting message is displayed on an entire area of the display.

3. The display apparatus of claim 1, wherein the user setting message is displayed on a partial area of the display.

4. The display apparatus of claim 1, further comprising a sound output,
   wherein the controller is configured to control the sound output in order to output a preset sound in response to the user setting message being displayed.

5. The display apparatus of claim 1, wherein the controller supplies power to the display and displays the user setting message in response to the condition satisfaction signal being received in a standby mode in which power is not supplied to the display.

6. The display apparatus of claim 1, further comprising a user input configured to set up at least one of a display interval, a display time and a display form of the user setting message.

7. A method of displaying a message of a display apparatus communicating with at least one home appliance, the message display method comprising:
   receiving input from a user of the display apparatus through a user input;
   performing, through a communicator, at least one communication with at least one home appliance;
   providing a list of at least one home appliance connected with the display apparatus via the communicator, based on the at least one communication;
   displaying the list of the at least one home appliance;
   selecting a home appliance from the displayed list based on the input;
   selecting a function associated with the home appliance based on the input;

in response to a preset condition satisfaction signal reporting completion of the function being received from the home appliance, displaying a user setting message, wherein the user setting message is customized by the user in advance to provide a communication between users of the display apparatus in connection with the completion of the function associated with the home appliance, and wherein the user setting message comprise at least one of a graphic layer text, a text or an image.

8. The message display method of claim 7, further comprising outputting a preset sound in response to the user setting message being displayed.

9. The message display method of claim 7, further comprising supplying power to a display in response to the condition satisfaction signal being received in a standby mode in which power is not supplied to the display.

10. The message display method of claim 7, further comprising setting up at least one of a display interval, a display time and a display form of the user setting message.

11. A display apparatus comprising:
 a display;
 a communicator configured to communicate with at least one home appliance;
 a storage configured to store a user setting message;
 a user input configured to receive input from a user of the display apparatus; and
 a controller configured to:
  control the communicator to perform at least one communication with at least one home appliance,
  provide a list of the at least one home appliance connected with the display apparatus via the communicator, based on the at least one communication,
  display the list of the at least one home appliance
  select a home appliance from the displayed list,
  select a function associated with the home appliance, and
  in response to a preset condition satisfaction signal reporting completion of the function being received from the home appliance, display a user setting message on the display,
 wherein the user setting message is customized by the user in advance to provide a communication between users of the display apparatus in connection with the completion of the function associated with the home appliance,
 wherein the user setting message comprises at least one of a graphic layer text, a text or an image, and
 wherein the controller transmits, to the home appliance, information related to the function through the communicator and receives the condition satisfaction signal from the home appliance.

12. The display apparatus of claim 11, further comprising a sound output,
 wherein the controller is configured to control the sound output in order to output a preset sound in response to the user setting message being displayed.

13. The display apparatus of claim 11, wherein the controller supplies power to a display and displays the user setting message in response to the condition satisfaction signal being received in a standby mode in which power is not supplied to the display.

* * * * *